United States Patent [19]

Kronholm, Jr.

[11] Patent Number: 5,261,502
[45] Date of Patent: Nov. 16, 1993

[54] MOVABLE SUB-PANEL FOR A VEHICLE DASHBOARD

[76] Inventor: Conrad J. Kronholm, Jr., 9 West Rd., East Haddam, Conn. 06423

[21] Appl. No.: 912,879

[22] Filed: Jul. 13, 1992

[51] Int. Cl.⁵ .............................................. B60K 37/06
[52] U.S. Cl. ..................... 180/90; 180/326; 180/334
[58] Field of Search .................. 180/90, 334, 326; 296/70

[56] References Cited

U.S. PATENT DOCUMENTS

| | | | |
|---|---|---|---|
| 2,630,187 | 3/1953 | DiLoreto | 180/90 |
| 2,765,863 | 10/1956 | Barényi | 180/90 |
| 3,448,821 | 6/1969 | McGuire | 180/90 |
| 4,690,432 | 9/1987 | Sakamoto et al. | 280/775 |
| 4,724,918 | 2/1988 | Raineri | 180/90 |
| 4,924,957 | 5/1990 | Gigla | 180/90 |
| 4,979,774 | 12/1990 | Houser | 296/70 |
| 4,982,810 | 1/1991 | Toy | 180/90 |

FOREIGN PATENT DOCUMENTS 291750 11/1988 Japan ........................... 180/90

Primary Examiner—Eric D. Culbreth
Attorney, Agent, or Firm—McCormick, Paulding & Huber

[57] ABSTRACT

A compartment of a motor vehicle has a steering wheel and a dashboard including a generally vertically-extending front surface and a movable sub-panel for carrying controls for one or more vehicle accessories. The sub-panel is supported for movement between a first position at the front surface of the dashboard and a second position in which the controls are readily accessible by the eyes and hands of the operator. A command device is provided for commanding movement of the sub-panel between the first and second positions and is operable without requiring the operator to look significantly away from the road or to reach with one hand to a location far away from the steering wheel.

5 Claims, 1 Drawing Sheet

MOVABLE SUB-PANEL FOR A VEHICLE DASHBOARD

BACKGROUND OF THE INVENTION

The present invention relates generally to a motor vehicle having a driver's compartment and a dashboard and steering wheel within the compartment, wherein the dashboard has a generally vertically-extending front surface facing the steering wheel, and deals more particularly with such a vehicle wherein the dashboard includes a sub-panel, carrying manually-operable controls, movable from a position at the front surface of the dashboard to a position located adjacent the steering wheel.

In the past, it has been customary to mount the controls for vehicle accessories on the front surface of a dashboard in a fixed position. Depending upon where the controls are fixed to the dashboard, the vehicle operator often must look to the dashboard, taking his or her eyes off of the road for a significant time period, and often must reach with one hand to a location away from the steering wheel for the procedure of selecting and setting the desired controls.

To alleviate the above-mentioned problems inherent in controls mounted to the dashboard, it is known to mount the controls for one or more vehicle accessories directly onto the steering wheel. However, this has the disadvantages that only a limited amount of space is available on the steering wheel, the controls on the steering wheel may interfere with safe operation of the wheel, and since the wheel must be able to rotate about the steering column, complicated mechanisms are needed to connect the controls on the rotatable steering wheel to the stationary structure of the automobile carrying the accessories.

The object of this invention is therefore to provide a mounting for the controls of one or more vehicle accessories which reduces the hazards and problems inherent in the controls being located either on the dashboard or on the steering wheel.

In keeping with the above, a more detailed object of the invention is to provide a means for mounting the controls for one or more vehicle accessories so that they are normally positioned at the front surface of the dashboard and, when the need for their manipulation arises, are movable from the dashboard to a position adjacent the steering wheel to minimize the time needed for the operator to adjust them and to reduce the movements required by his or her eyes and hands.

A further object of the invention is to provide a device for commanding movement of the sub-panel which is operable in a way such that the operator need neither look away from the road nor reach away from the steering wheel with one hand in order to command movement of the sub-panel.

Further objects and advantages of the invention will become clear from the following specification and from the appended drawings and claims.

SUMMARY OF THE INVENTION

The invention resides in a vehicle having a driver's compartment and a dashboard at the front of the compartment, wherein the dashboard has a generally vertically-extending front surface facing a steering wheel. The dashboard includes a subpanel which carries controls for one or more vehicle accessories, such as the heater, air conditioner, wipers, radio, cigar/cigarette lighter and the like, and is supported for movement between a first position in which the sub-panel is generally flush with the front surface of the dashboard and a second position in which the sub-panel is located adjacent the steering wheel. Drive means are coupled between the sub-panel and the dashboard or other stationary structure of the vehicle to move the sub-panel between the first and second positions. When the sub-panel is in the first position, the means for supporting and driving the sub-panel are located behind the front surface of the dashboard so as to be out of the way of the operator. When the sub-panel is in the second position, the vehicle operator need neither reach nor look far from the steering wheel for the procedure of selecting and adjusting the desired controls.

The invention also resides in a device for commanding movement of the sub-panel between the first and second positions which is operable by the vehicle operator without the need to look away from the road or to reach with one hand to a location away from the steering wheel. Such device, if hand-operated, is so located, preferably on the steering wheel, that the operator need not reach far nor look away from the road to gain access to it; however, the device may also be voice responsive in which case it may be located at any convenient place within range of the operator's voice.

The invention more particularly resides in the sub-panel, when in its second position, being located near the top of the dashboard, very close to the operator's line of sight to the road ahead, so that the operator may readily select and set the desired controls without having to divert his or her eyes a significant distance away from the road.

DETAILED DESCRIPTION OF THE PREFERRED EMBODIMENTS

The invention may be applied to various different motor vehicles such as automobiles, busses, trucks and carts; and for the purpose of illustration is shown and described herein as being applied, by way of example, to an automobile.

Figure 1:
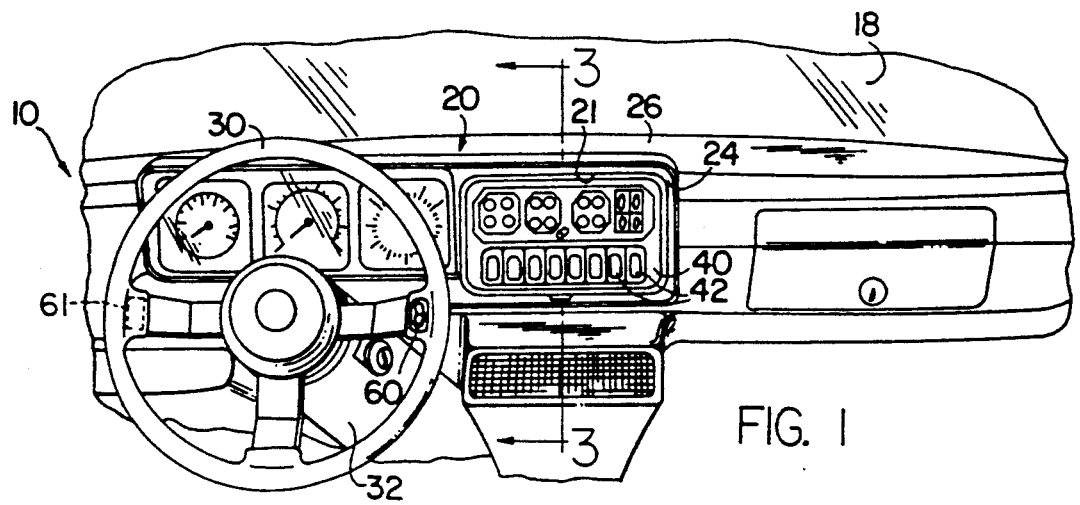
FIG. 1 is a perspective and somewhat schematic view showing the driver's compartment of an automobile embodying the invention, with the control carrying sub-panel of the dashboard being shown in its first or normal position at the front surface of the dashboard.

Turning to the drawings, FIG. 1 shows somewhat schematically the driver's compartment 10 of an automobile embodying the invention, as seen from the driver's or operator's seat. The compartment is of a generally conventional construction including a dashboard 20, a steering wheel 30 supported by a steering column 32, and a windshield 18 through which the operator has a field of forward view with a lower limit. The dashboard 20 has a generally vertically-extending front surface 24 which extends downwardly from a top surface 26 and faces generally towards the steering wheel 30.

The lower limit of the driver's field of forward view is that lower point at which the driver's field of view becomes impeded by a portion of the vehicle located forwardly of the operator; and it varies with different drivers and different vehicles. Typically, in the case of an automobile the vehicle is so constructed and the operator sits such that the lower limit of the forward view is defined by the automobile hood. However, in other cases, especially if the operator has a short upper body or has his seat lowered, the driver's lower limit of forward view may be defined by the top surface 26 of the dashboard 20.

The dashboard 20 has associated with it a sub-panel 40 normally positioned generally flush with the front surface 24 of the dashboard 20, as seen in FIG. 1. The sub-panel 40 carries manually-operable controls, indicated at 42, for one or more vehicle accessories such as an air conditioner, heater, radio, rear defroster, wipers, cigar/cigarette lighter and the like. If desired the dashboard may include one or more sub-panels in addition to the one shown at 40; the controls for each accessory may be carried by a separate sub-panel, or the controls for two or more accessories may be carried by a single sub-panel.

Figure 2:
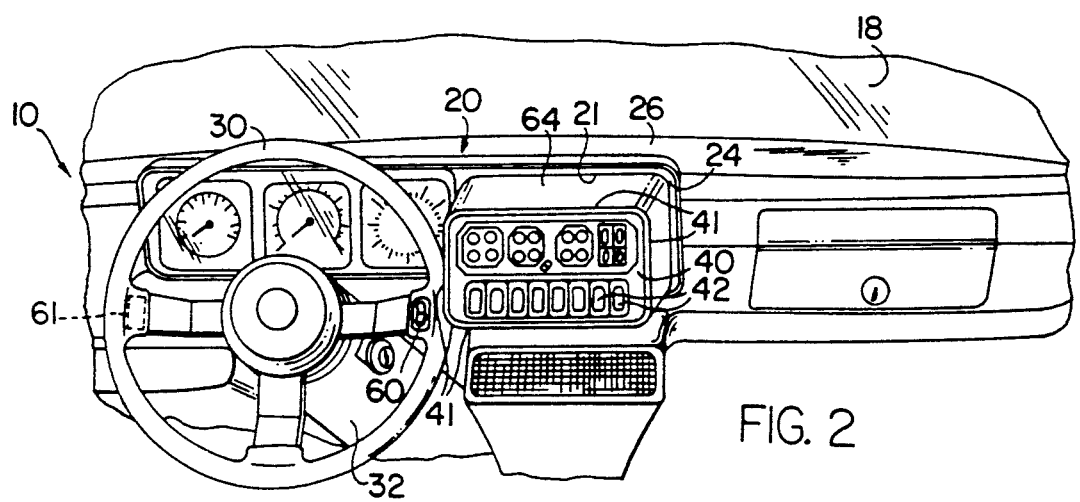
FIG. 2 is a partial perspective view similar to FIG. 1, but showing the sub-panel in its second or deployed position.

In accordance with the invention, the control carrying sub-panel 40 is movable from its first or normal position of FIG. 1 to a second or deployed position at which the controls are more easily reached by the eyes and hands of the operator. FIG. 2 shows the sub-panel 40 in its second position where it is located adjacent the steering wheel 30. A housing 64, which may be telescopic, extends from the peripheral surface 41 of the sub-panel 40 towards and through a correspondingly-shaped opening 21 provided through the front surface 24 of the dashboard 20. The housing may serve several purposes, namely to provide a support structure for supporting the sub-panel 40 for movement between the first and second positions, to keep dirt and other debris out of the dashboard and said sub-panel moving mechanism when the sub-panel is in its second position, and to create a neater appearance when the sub-panel is in the second position by hiding the sub-panel moving mechanism and the mechanisms which connect the controls to their respective accessories.

Figure 3:
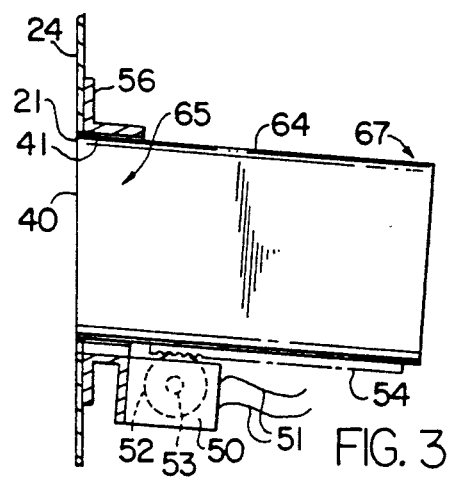
FIG. 3 is a sectional view taken along line 3—3 of FIG. 1.

The housing 64, as seen in FIG. 3, has a first end 65 attached to the peripheral surface 41 of the sub-panel 40, and a second end 67. The housing 64 further has a substantially uniform cross-section, taken perpendicularly to a line between the first and second positions, corresponding to the peripheral surface 41 of the sub-panel 40 and also is substantially hollow and of a length at least equal to or slightly longer than the distance between the first and second positions.

A bracket 56 fixed to the stationary structure of the vehicle adjustably supports the housing 64, extends a distance behind the front surface 24 of the dashboard 20 and has a cross-section slightly larger than that of the housing 64. The bracket 56 is positioned near the dashboard opening 21 so that the housing 64 is movable through both the opening 21 and bracket 56. When the sub-panel 40 is in the first position, a portion of the housing 64 near the first end 65 is adjacent the bracket 56. When the sub-panel 40 is in the second position, the second end 67 of the housing 64 is adjacent the bracket 56. In addition, the bracket 5 couples the sub-panel 40 with the dashboard 20 in such a way that the sub-panel when in its second position is near, and preferably immediately adjacent, the lower limit of the operator's field of forward view, as shown in FIG. 2. Such a position, as previously mentioned, reduces the time needed for the operator to look away from the road and to reach with one hand away from the steering wheel, lessening the dangers inherent therefrom.

A drive means is also provided for moving the sub-panel 40 between the first and second positions. This means may take various different forms, however in the illustrated and preferred instance it comprises a rack 54 and a pinion 52 attached to a reversible electric motor 50, as shown in FIG. 3. The rack 54 is attached to and extends axially along the underside of the housing 64 and the pinion 52 is fixed to a rotatable drive shaft 53 of the motor 50. The motor 50 is in turn attached to the bracket 56 such that the pinion 52 engages the rack 54. The position of the rack 54 on the underside of the housing 64 corresponds to a channel (not shown) in the bracket 56 which allows the rack 54 to move therethrough. It will be noted that the particular arrangement of the rack 54 and pinion 52 and the motor 50 and shaft 53 may be altered without departing from the invention.

The motor 50 is electrically coupled by leads 51 through command means to a power source such as the vehicle's battery (not shown). A command device controls the operation of the motor 50, and thus the movement of the sub-panel 40, and preferably is one not requiring the operator to look significantly, if at all, away from the road or to reach far away, if at all, from the steering wheel with one hand to perform the action of commanding movement of the sub-panel.

In FIG. 1 the command device is shown to be a push button switch 60 located on the steering wheel 30. The switch 60 and related circuits connecting it to the motor 50 may take various forms which enable the operator through manipulation of the switch to move the sub-panel 40 in and out between the first and second positions. In the illustrated and preferred instance, the switch and related circuits are similar to those known and used for controlling powered vehicle windows.

As an alternative, the command device may also be one operable in response to voice commands. Using such a command device the operator can command movement of the sub-panel without at all having to look away from the road nor to reach away from the steering wheel with one hand. Moreover, the device may be located anywhere in the compartment 10, so long as it is within the range of the driver's voice. In FIGS. 1 and 2 such voice responsive command device is indicated by broken lines at 61 and is mounted on the steering wheel 30, and when used may replace the switch 60.

In the foregoing, a novel movable control carrying subpanel for a vehicle dashboard has been disclosed in some detail. However, numerous modifications and substitutions may be made with respect to the specifically disclosed embodiment without departing from the spirit of the invention or its scope as defined by the appended claims. Accordingly, the present invention has been described by way of illustration only rather than by way of limitation.

I claim:

1. In a vehicle having a driver's compartment with a steering wheel and a dashboard at the front of the compartment, the dashboard having a generally vertically-extending front surface which faces generally towards the steering wheel, the combination comprising:

a sub-panel carrying control means for at least one vehicle accessory, support means supporting said sub-panel for movement between a first position at which said sub-panel is generally flush with the front surface of said dashboard and a second position at which said sub-panel is located adjacent the steering wheel, drive means including a motor coupled to said sub-panel for moving said sub-panel between said first and second positions, said support means and said drive means both being located behind the dashboard when said sub-panel is in said first position, and a command device for controlling the operation of said motor of said drive means, said command device being located remotely from said sub-panel and being operable by the driver of said vehicle without said driver having to move his or her eyes as far from his or her normal view of the road or his or her hand as far from said steering wheel as would be the case if said command device were a hand operated one mounted on said subpanel.

2. The combination of claim 1 wherein the dashboard includes a top surface located adjacent and above the front surface of said dashboard, said second position further characterized by being adjacent the top surface.

3. In a vehicle having a driver's compartment with a steering wheel and a dashboard at the front of the compartment, the dashboard having a generally vertically-extending front surface which faces generally towards the steering wheel, the combination comprising:

a dashboard and a sub-panel carrying control means for at least one vehicle accessory, support means supporting said sub-panel for movement between a first position at which said sub-panel is generally flush with the front surface of said dashboard and a second position at which said sub-panel is located adjacent the steering wheel.

drive means coupled to said sub-panel for moving said sub-panel between said first and second positions.

said support means and said drive means both being located behind the dashboard when said sub-panel is in said first position, and a command device for controlling the operation of said motor of said drive means, said command device being located remotely from said sub-panel, said command device including a manually operable control member located on the steering wheel.

4. In a vehicle having a driver's compartment with a steering wheel and a dashboard at the front of the compartment, the dashboard having a generally vertically-extending front surface which faces generally towards the steering wheel. the combination comprising:

a sub-panel carrying control means for at least one vehicle accessory.

support means supporting said sub-panel for movement between a first position at which said sub-panel is generally flush with the front surface of said dashboard and a second position at which said sub-panel is located adjacent the steering wheel, drive means coupled to said sub-panel for moving said sub-panel between said first and second positions.

said support means and said drive means both being located behind the dashboard when said sub-panel is in said first position, and a command device for controlling the operation of said motor of said drive means, said command device being located remotely from said sub-panel, said command device being operable in response to voice commands.

5. In a vehicle having a driver's compartment with a steering wheel and a dashboard at the front of the compartment, the dashboard having a generally vertically-extending front surface which faces generally towards the steering wheel, the combination comprising:

a sub-panel carrying control means for at least one vehicle accessory, support means supporting said sub-panel for movement between a first position at which said sub-panel is generally flush with the front surface of said dashboard and a second position at which said sub-panel is located adjacent the steering wheel.

drive means coupled to said sub-panel for moving said sub-panel between said first and second positions.

said support means and said drive means both being located behind the dashboard when said sub-panel is in said first position, and a command device for controlling the operation of said motor of said drive means, said command device being located remotely from said sub-panel, said drive means including a rack and pinion drivingly connected between the dashboard and said sub-panel and a reversible electric motor having a rotatable drive shaft for rotating said pinion.

* * * * *